United States Patent [19]
Dobert et al.

[11] Patent Number: 5,685,631
[45] Date of Patent: Nov. 11, 1997

[54] REPLACEMENT SAFETY LIGHT SYSTEM

[76] Inventors: Frank Dobert, Earlton Gayhead Rd., Box 204, Earlton, N.Y. 12058; David Chan, 19 Bond St., Passaic, N.J. 07055

[21] Appl. No.: 554,730

[22] Filed: Nov. 8, 1995

Related U.S. Application Data

[63] Continuation-in-part of Ser. No. 401,634, Mar. 9, 1995, abandoned.

[51] Int. Cl.$^6$ .................................................. F21L 1/00
[52] U.S. Cl. ........................ 362/158; 362/190; 362/398; 362/800
[58] Field of Search ...................... 362/157, 158, 362/190, 267, 332, 398, 399, 427, 800, 184; 340/473

[56] References Cited

U.S. PATENT DOCUMENTS

| | | | |
|---|---|---|---|
| 2,932,018 | 4/1960 | Schwartz | 340/473 |
| 3,329,810 | 7/1967 | Meagher | 362/158 |
| 4,374,376 | 2/1983 | Pillifant, Jr. | 340/473 |
| 4,451,871 | 5/1984 | Kirkley et al. | 362/186 |
| 4,875,028 | 10/1989 | Chou | 340/473 |
| 5,446,345 | 8/1995 | Halabi et al. | 362/267 |
| 5,446,441 | 8/1995 | Su | 362/72 |

*Primary Examiner*—Ira S. Lazarus
*Assistant Examiner*—Sara Sachie Raab
*Attorney, Agent, or Firm*—Schmeiser, Olsen & Watts

[57] ABSTRACT

A replacement safety light system comprising a self-contained, self-powered, individual safety light designed to be secured to a vehicle as a replacement safety light or to be used as a free-standing warning light or flare. The safety light utilizes a bifocal lens and blue light emitting diodes to provide enhanced visual recognition.

7 Claims, 3 Drawing Sheets

5,685,631

REPLACEMENT SAFETY LIGHT SYSTEM

CROSS-REFERENCE TO RELATED APPLICATIONS

This application is a continuation-in-part of U.S. patent application Ser. No. 08/401,634 filed Mar. 9, 1995, now abandoned, which is hereby incorporated by reference.

FIELD OF THE INVENTION

Generally, this invention relates to the field of temporary lighting systems. More specifically, this invention is a self-contained replacement safety light system. For example, the system may be used as an emergency road flare; as a warning light on barriers or obstacles; as a temporary replacement safety light on a boat, train, bicycle, automobile, tractor trailer or other vehicle; and in a multitude of other emergency situations.

BACKGROUND OF THE INVENTION

Virtually all vehicles are required by law to have some form of light system for use during periods of low visibility such as dusk, night and poor weather conditions. Naturally, there are times when this permanent light system will fail, whether due to vandalism, breakage or simply due to a burned out bulb. Thus, a need existed for a quick, temporary replacement safety light. Typically, previous replacement lights were too bulky or large to be easily available for quick use in an emergency or in an every day, routine situation such as a burned out bulb. Also, previous replacement lights were not easily adaptable to the different environments in which they might be needed.

For example, a trucker who has a burnt out taillight or who has a roadside has the need for a self-contained unit to ensure his safety and visibility for motorists.

The danger of an obstacle in the roadway such as a fallen tree limb or disabled vehicle can be greatly reduced by the placement of flares as a warning. Despite their usefulness, due to their nature, ordinary flares are inherently difficult and dangerous to handle (e.g. as a fire hazard) and have a relatively short burn time.

Therefore, a need existed to provide an adaptable, small-sized, high-powered, easily managed safety light.

SUMMARY OF THE INVENTION

It is an object of the present invention to provide a self-contained, high-powered replacement safety light system.

It is another object of the present invention to provide a replacement safety light system which can be readily available for use in virtually any emergency situation and which requires minimal effort and expense to utilize efficiently.

The present invention accomplishes these object by providing a completely independent, small size, replacement safety light system. The system contains its own power supply, having the capability of operating on standard household quality "AA" batteries, and has a brightness which makes it suitable for individual use.

The system utilizes energy efficient LED lights which have the further advantage of eliminating the problem of corrosion which is frequently associated with typical light systems. The LED lights also have a very long useful life. With an LED light system, close to 500 hours of use can be realized, in comparison to as little as 200 hours with a conventional light system.

The lens of the present invention has a concave, dome shape and a centrally located circular configuration imbedded within. This configuration provides the lens with a bifocal characteristic which causes the light emitted from the LED to be brighter and to travel a greater distance. A typical temporary light can be seen from approximately 500 feet, compared to the 1500 foot distance of the light of the present invention. The present invention may be operated in either a constant or a flash/blink mode.

The lens can be any of an array of colors, furthering the light's utility. For instance, a blue lens may be employed when the system is being used in association with a train, an orange lens would be used with an ambulance and a red lens with a fire vehicle. Regardless of the color of the lens, in order to achieve the maximum effectiveness of the light, the central circular configuration should be of a clear color.

The light of the present invention is encased in a shatter-resistant, water-proof, hard plastic housing which is virtually indestructible in routine, every day use. Additionally, the light is of a size that fits easily under the seat or into the glove compartment of an average automobile.

The housing includes a cover which encompasses the bifocal lens. The cover has a highly reflective coating to enhance the visual recognition of the light. The housing has a gasket to effectuate a waterproof seal with the cover.

The housing of the present invention is equipped with at least one magnet and a retractable support stand on the back which makes the unit easily adaptable to a variety of uses (e.g. placed along the side of a roadside or in the back pocket of emergency personnel). It may be attached to the exterior of a boat, train, bicycle, automobile, tractor trailer or other vehicle as a replacement light, as well as stand freely on the ground or other surface as a warning light or flare. Having a waterproof, plastic housing allows the unit to be readily available for use in rain, snow or any other wet environment.

To implement the system as a temporary safety light replacement, the operator of a vehicle simply retrieves the light from the glove box or other storage place, flips the on/off switch and secures it to the vehicle in close proximity to the non-functioning safety light by means of the magnets. For use as a warning light, the retractable support stand is used. After prolonged use, if the light begins to fail, the operator can easily replace the batteries. These and other objects of the invention of the invention will become more apparent from the following description and appended drawings.

DETAILED DESCRIPTION OF DRAWINGS

Figure 1:
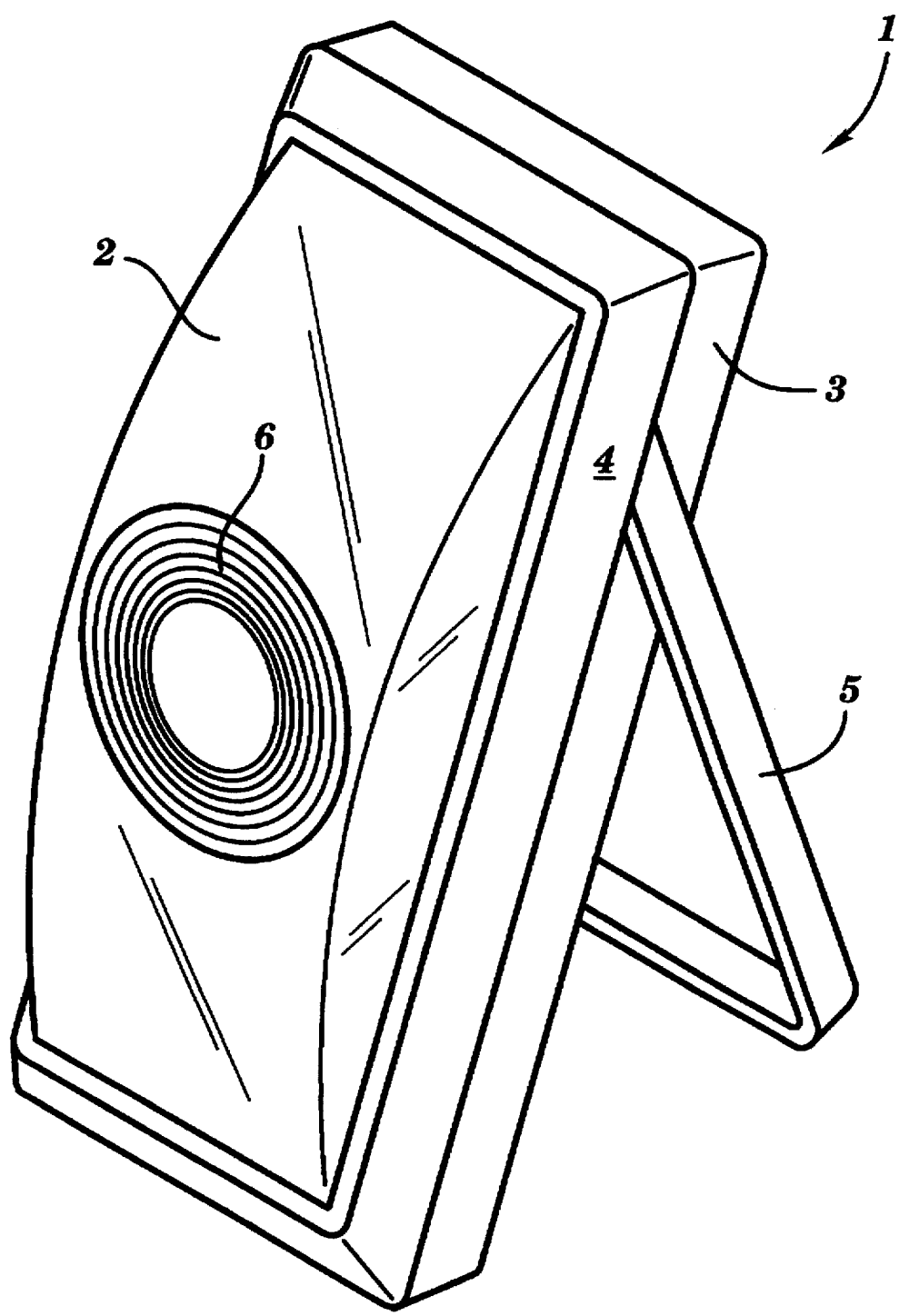
FIG. 1 is a front perspective view of the safety light system of an embodiment of the present invention with the retractable support stand in the open position.

Referring now to the drawings in greater detail, there is illustrated a replacement safety light system, generally designated as 1, wherein like reference numerals refer to like components throughout the drawings.

As illustrated in FIG. 1, the replacement safety light system of the present invention, generally represented as 1, is comprised of a lens 2, a housing 3, a cover 4, and a retractable support stand 5. Preferably, these elements are made of a shatter-resistant, waterproof hard plastic for durability and adaptability to different environments.

As illustrated in FIG. 1, the lens 2 is encompassed within the cover 4. In the preferred embodiment, the median portion of the lens has a concave, domed shape with a centrally located circular configuration 6 imbedded therein. The circular configuration gives the lens a bifocal characteristic. Preferably, this configuration is of a clear color for enhanced light refraction.

Figure 2:
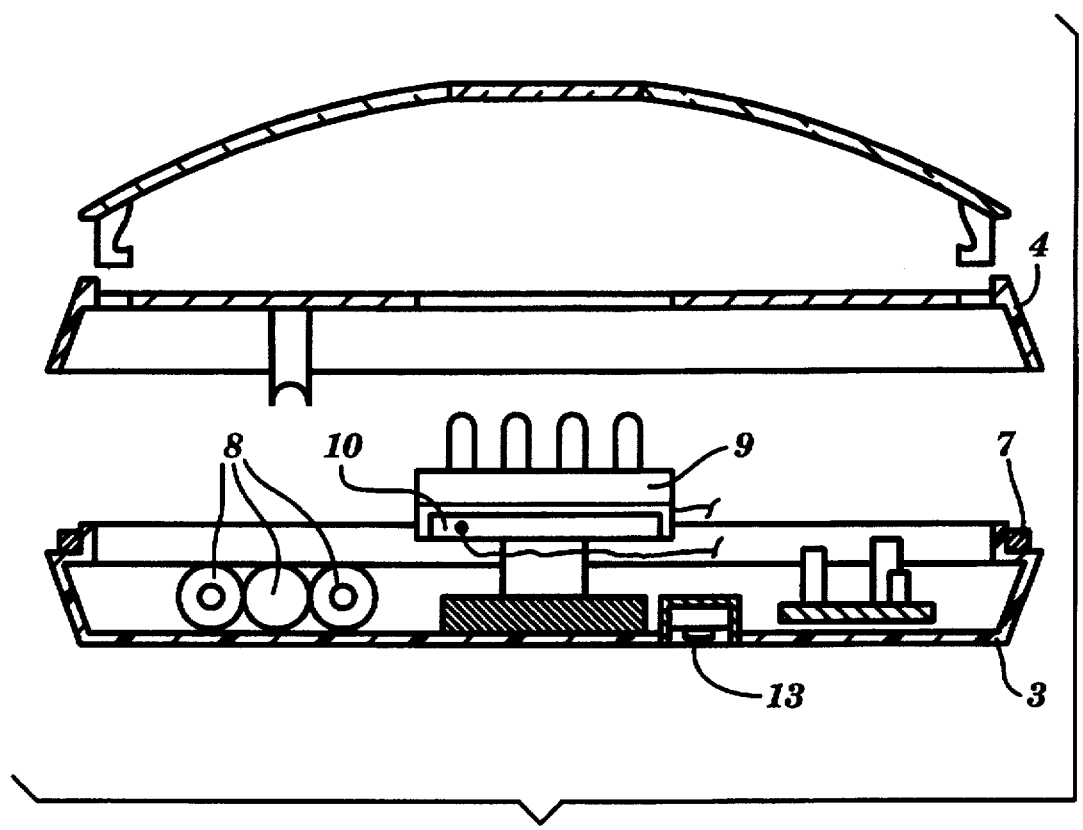
FIG. 2 is an exploded side sectional view of the safety light system of an embodiment of the present invention.

Referring to FIG. 2, along the upper open perimeter of the housing 3 there is located a gasket 7 which acts to effect a waterproof seal between the cover 4 and the housing 3. For amplified reflection of light through the lens, the outward facing surface of the cover has a highly reflective coating.

Figure 3:
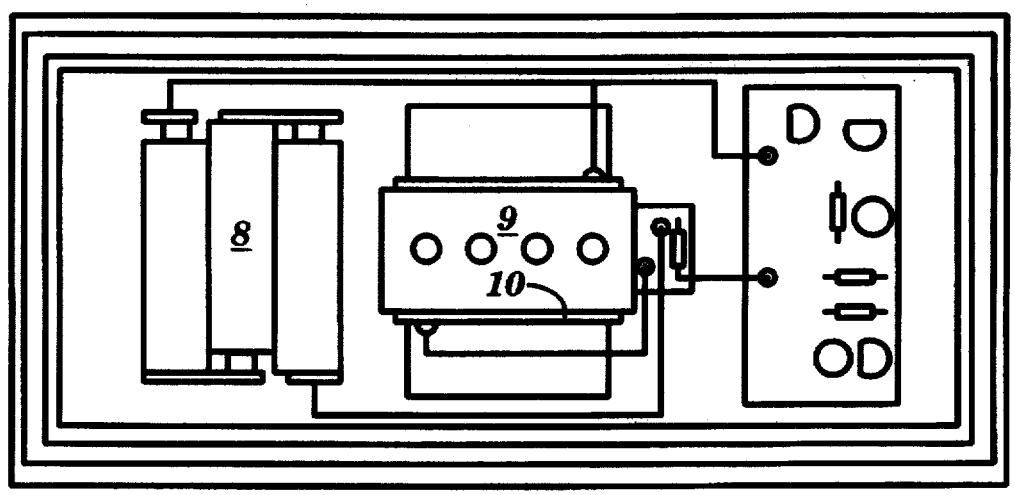
FIG. 3 is a top view of the safety light system of an embodiment of the present invention with the lens and cover removed.

As can be seen by reference to FIGS. 2 and 3, encased within the housing 3 is an energy source, generally represented as 8, a plug-in array of blue light emitting diodes (LED) 9, an electrical contact board 10 into which the LED array 9 is plugged, and an electric circuitry board 11.

Figure 6:
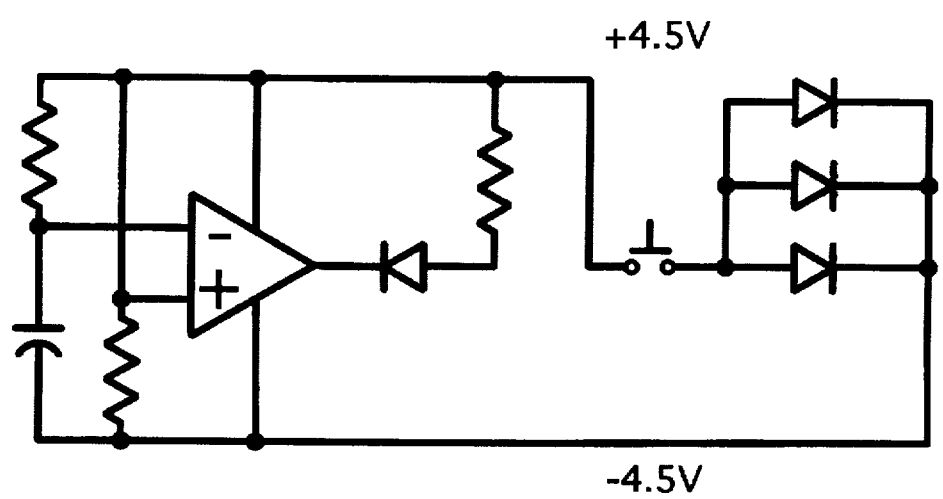
FIG. 6 is a schematic view of the electrical circuitry for the self-contained energy source within the safety light system.

The energy source 8, preferably three household quality "AA" batteries, depicted in FIGS. 2 and 3, supplies power to the LED array 9 via standard electrical wiring. FIG. 6 is a schematic drawing of the electrical circuit. The on/off switch 13 (optionally a touchpad may be used for waterproofing purposes) for the circuit is located on the back exterior surface of the housing. The electrical wiring circuit employed will allow the light to operate in a constant or a flash/blink mode.

Figure 4:
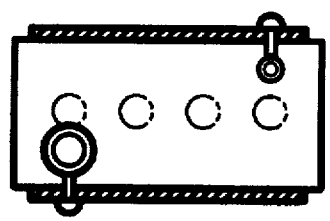
FIG. 4 is a top view of the plug-in LED light array.
Figure 5:
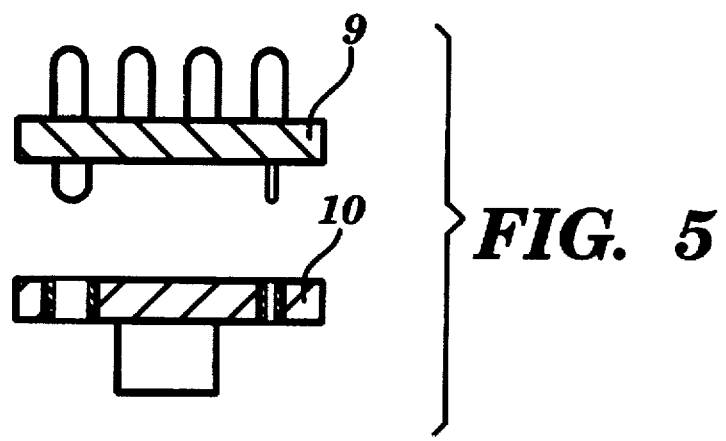
FIG. 5 is a side sectional view of the plug-in LED light array and the electrical contact board of the self-contained energy source.

FIGS. 4 and 5 are included to illustrate the plug-in nature of the LED array 9.

FIG. 6 depicts the circuitry of light 1

The foregoing detailed description of the preferred embodiments of the present invention has been presented for purposes of illustration and description. It is not intended to be exhaustive or to limit the invention to the precise form disclosed, and other modifications and variations may be possible in light of the above teaching. Such modifications and variations which may be apparent to a person skilled in the art are intended to be included within the scope of this invention as defined by the accompanying claims.

I claim:

1. A safety light comprising:

a lens;

a housing attached to said lens;

a self-contained energy source within said housing;

a plug-in array of light emitting diodes operatively connected to said energy source; and, wherein said housing includes a cover, having a highly reflective coating, encompassing said lens.

2. The safety light of claim 1 wherein said housing includes at least one magnet positioned for attachment of said safety light to a metallic surface.

3. The safety light of claim 1 wherein said housing includes a retractable support stand.

4. The safety light of claim 1 wherein said housing includes a gasket to effect a waterproof seal between said housing and said cover.

5. The safety light of claim 1 wherein said lens has a median portion having a domed curvature protruding outwardly therefrom.

6. The safety light of claim 5 wherein said lens has a central bifocal circular portion.

7. The safety light of claim 6 wherein said bifocal circular portion is clear.

* * * * *